US012637364B2

(12) United States Patent
Baker et al.

(10) Patent No.: US 12,637,364 B2
(45) Date of Patent: May 26, 2026

(54) WATER TREATMENT SYSTEM AND METHOD FOR USE WITH AN ENVIRONMENTAL CHAMBER OR AN INCUBATOR

(71) Applicant: Caron Products and Services, Inc., Marietta, OH (US)

(72) Inventors: Milton F. Baker, Vincent, OH (US); Robert W. Dotterer, Sardis, OH (US); Brian K. Haught, Marietta, OH (US); Zachery T. Mallett, Marietta, OH (US); Steven F. Brooker, Marietta, OH (US)

(73) Assignee: CARON PRODUCTS AND SERVICES, INC., Marietta, FL (US)

( * ) Notice: Subject to any disclaimer, the term of this patent is extended or adjusted under 35 U.S.C. 154(b) by 333 days.

(21) Appl. No.: 18/217,768

(22) Filed: Jul. 3, 2023

(65) Prior Publication Data
US 2024/0002255 A1 Jan. 4, 2024

Related U.S. Application Data

(60) Provisional application No. 63/358,087, filed on Jul. 1, 2022.

(51) Int. Cl.
C02F 1/00 (2023.01)
C02F 1/28 (2023.01)
(Continued)

(52) U.S. Cl.
CPC .............. *C02F 1/008* (2013.01); *C02F 1/006* (2013.01); *C02F 9/00* (2013.01); *F24F 3/14* (2013.01);
(Continued)

(58) Field of Classification Search
None
See application file for complete search history.

(56) References Cited

U.S. PATENT DOCUMENTS 8,252,171 B2 * 8/2012 Doran ....................... C02F 9/20
210/243
2013/0284647 A1 * 10/2013 Briscoe ................... C02F 1/008
210/96.1

FOREIGN PATENT DOCUMENTS

KR 20210097438 A * 8/2021 .............. C02F 3/109

OTHER PUBLICATIONS

Pitts, C.R., "The ionization obtained by bubbling air through various solutions", The Journal of Physical Chemistry, 1927, vol. 31, No. 5, pp. 693-702.
(Continued)

*Primary Examiner* — Krishnan S Menon
(74) *Attorney, Agent, or Firm* — John L. DeAngelis; Wolter Van Dyke Davis, PLLC

(57) ABSTRACT

A water treatment system for supplying water for use in humidifying a chamber. A system piping circuit carries water with a desired $H_2O_2$ concentration and comprises a plurality of controllable valves to determine water flow paths through the piping circuit, thereby subjecting the water to one or more treatment processes. A holding reservoir receives intake water from one or more water sources and also receives $H_2O_2$. A pump is activated by a control system to supply the $H_2O_2$ from a source into the holding reservoir. The control system activates the pump according to a predetermined schedule or according to a measured concentration of $H_2O_2$ in the piping circuit, as measured by certain system sensors. An $H_2O_2$ neutralizing device neutralizes the $H_2O_2$ in the water prior to supplying the water to humidification components to humidify the chamber.

19 Claims, 5 Drawing Sheets

(51) Int. Cl.

| | |
|---|---|
| *C02F 1/32* | (2023.01) |
| *C02F 1/42* | (2023.01) |
| *C02F 1/50* | (2023.01) |
| *C02F 1/68* | (2023.01) |
| *C02F 1/72* | (2023.01) |
| *C02F 9/00* | (2023.01) |
| *F24F 3/14* | (2006.01) |

(52) U.S. Cl.
CPC ................ *C02F 1/283* (2013.01); *C02F 1/32* (2013.01); *C02F 1/42* (2013.01); *C02F 1/505* (2013.01); *C02F 1/68* (2013.01); *C02F 1/722* (2013.01); *C02F 2201/005* (2013.01); *C02F 2209/006* (2013.01); *C02F 2301/043* (2013.01); *C02F 2301/066* (2013.01); *C02F 2303/04* (2013.01)

(56) References Cited

OTHER PUBLICATIONS

Westin, Jack, "Ionization of Water", MCAT Content, downloaded from Internet Aug. 24, 2023, https://jackwestin.com/resources/mcat-content/acid-base-equilibria/ioniz . . . , 5 pages.
Wikipedia, "Self-ionization of water", https://en.wikipedia.org/wiki/Self-ionization_of_water, Downloaded from internet Aug. 24, 2023, 4 pages.

* cited by examiner

70

WATER TREATMENT SYSTEM AND METHOD FOR USE WITH AN ENVIRONMENTAL CHAMBER OR AN INCUBATOR

CROSS REFERENCE TO RELATED APPLICATIONS

This application claims benefit of Provisional Patent Application No. 63/358,087, filed Jul. 1, 2022, the entire contents of which are incorporated by reference as if fully set forth herein, under 35 U.S.C. § 119(e).

BACKGROUND OF THE INVENTION

A control mechanism associated with an environmental chamber or incubation chamber controls various atmospheric variables within the chamber, including air temperature, humidity, lighting, and the concentration $O_2$, $N_2$, and $CO_2$. A user/operator sets one or more variables such as the desired temperature and relative humidity values. Responsive thereto, the control mechanism heats or cools (only the heating operation is available in an incubation chamber) and humidifies or dehumidifies (some chamber designs provide only humidification) the air within the chamber according to a predetermined software program to reach and then maintain the temperature and humidity settings. Typically, a PID (proportional, integral, derivative) or a comparable control algorithm is used in the control loop.

Water is used to increase the humidity within the chamber and the quality of that water is critical. Water with impurities, such as dissolved solids, leaves a residue after the water has evaporated. This causes scale to build up on the humidification devices, such as a nozzle, heater, or nebulizer, as well as on any surface that collects water, such as overspray water. Obviously, the scale build-up increases maintenance tasks to keep the chamber in good operating condition.

Ultra-pure water (with a resistivity of about 18.3 MΩ-cm) has many uses in the laboratory and is therefore readily available. However, its purity exceeds the ideal resistivity range for humidification water. Water that is too pure (i.e., does not contain enough ions) is corrosive and degrades the humidification system as well as chamber interior wall surfaces. This corrosive behavior increases at higher temperature and creates higher humidity levels.

Dilution to lower resistivity can be achieved by mixing the ultra-pure water with tap water (or with any water that is "less pure") in a calculated ratio such that the resistivity of the diluted water is within the desired range. However, this process requires two water sources (i.e., ultra-pure water and tap water) and thus is not an ideal solution.

Common water quality units of interest include: resistivity, conductivity, total dissolved solids, and hardness. Experience has shown that water resistivity between about 50 kΩ-cm and about 1 MΩ-cm is a favorable range for water that will be used to humidify an environmental chamber.

Water within this ideal resistivity range has a higher resistivity than tap water (with a resistivity about 1000 to 5000 ohms-cm). Typical processes used to raise the resistivity of tap water (or its equivalent, lowering water conductivity) include distillation, reverse osmosis, and deionization. All are common practices and the art of practicing such techniques to bring water resistivity to a value within this range is well established.

Notwithstanding its beneficial purification process, water stored in a water treatment system tends to harbor contaminates and spawn bacteria growth over time. The collection and re-use of condensate from the environmental chamber is an additional source of bacteria. While features such as antimicrobial coatings, antimicrobial surfaces, filters, and continuous internal circulation loops help to minimize contamination growth, none of these techniques for treating the water are able to 'kill' active bacteria that adheres to wetted surfaces of the water treatment system, internal wetted surfaces of the humidification circuit within the environmental chamber, and bacteria that is within the water circulation loop (including exterior tubing between the water treatment system and the environmental chamber).

Active bacteria can be killed by exposure to UV-C light (with a wavelength between about 100 and 300 nanometers). But UV-C exposure is limited to the water and surfaces on which the light is incident. Wetted surfaces in reservoirs, tubing, fittings, etc. are not directly exposed to the light.

Chemical treatment of water, such as a germicidal solution or chlorine, may be used to treat all the wetted surfaces. However, these chemicals are harmful to humans and/or the product within the chamber when they are introduced into the chamber's humidification system and then evaporated into the air. Therefore, these chemical treatments are used only at specific or scheduled times when the chamber is otherwise not in use. And during these cleaning times, the water purification system must be disconnected or otherwise isolated from the chamber and therefore conditioned water is not available to the chamber for humidifying the chamber.

BRIEF DESCRIPTION OF THE FIGURES

The present invention can be more easily understood and the advantages and uses thereof more readily apparent when the detailed description of the present invention is read in conjunction with the figures wherein.

In accordance with common practice, the various described and illustrated features are not drawn to scale, but are drawn to emphasize specific characteristics relevant to the invention. Like reference numerals denote like elements throughout the figures and text.

DETAILED DESCRIPTION OF THE INVENTION

Figure 1:
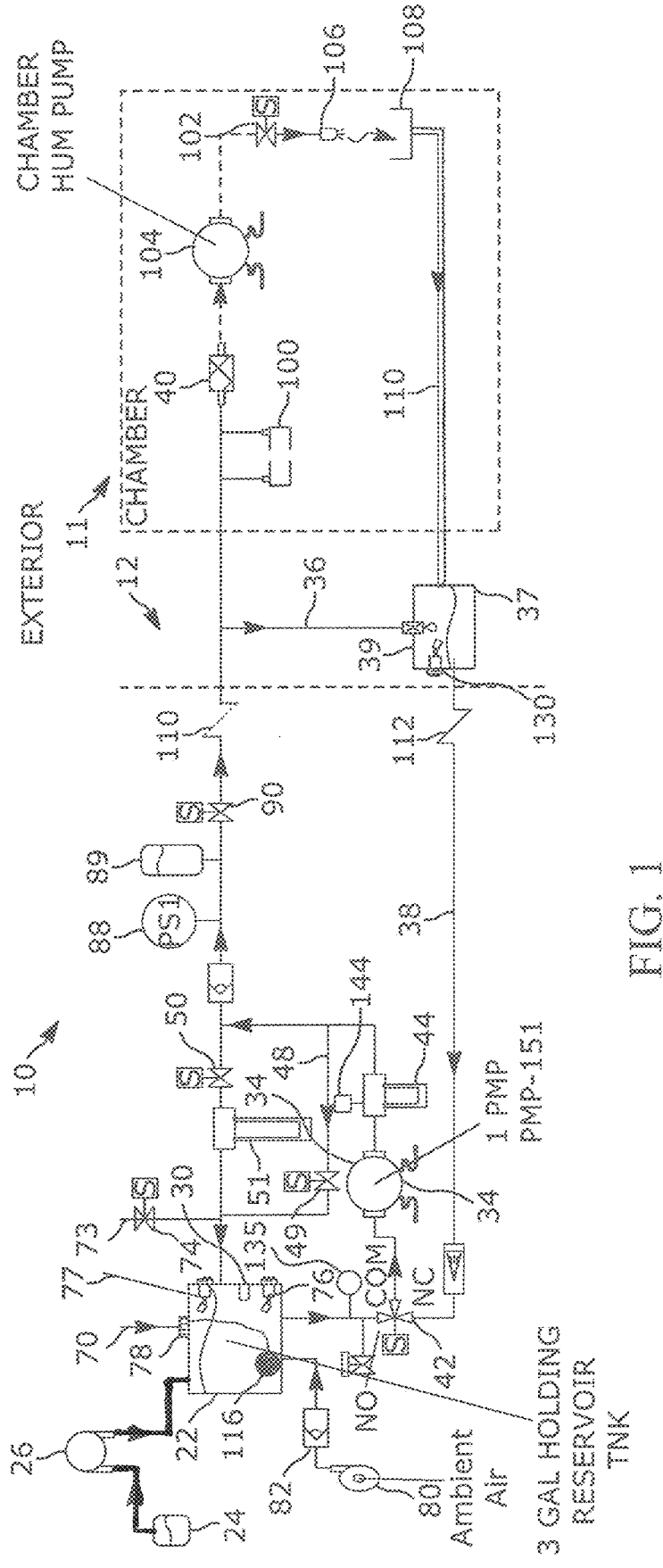
FIG. 1 depicts a piping diagram of the system of the invention.

The end-use of a water treatment system is well defined, i.e., for either ionizing or deionizing water, and removing particulates and bacteria. Advantageously, a system of the present invention senses/measures the water quality and then activates an ionizing or deionizing process to reach a desired resistivity target and purifies the water with $H_2O_2$. The $H_2O_2$ purification process is especially important to limit the growth of bacteria and other contaminants within the chamber humidifying water, as currently employed devices are unable to consistently and effectively remove bacteria and other contaminants as required by chamber users. Additionally and advantageously, control of the water treatment system of the invention can be, and typically is, integrated with the chamber control system. This is an especially important feature as the touchscreen input for the chamber control system can also be used to control the water treatment system of the invention.

The present invention can also activate other processes (by opening or closing certain valves) as appropriate to purify the water, including a bleed bypass recirculation loop to prevent the water from stagnating and recirculation of return water (condensate) from an environmental or humidification chamber.

In addition to the user of $H_2O_2$, antimicrobial coatings (such as silicon dioxide) are applied to the interior surfaces of the various system components, especially including interior wetted surfaces of bacteria-prone reservoirs and pipes and wetted surfaces. Coating on the wetted surfaces inhibits bacteria and spores from growing on those surfaces. Antimicrobial materials (such as silver or copper) that have direct contact with water are also used.

As known by those skilled in the art, environmental chambers comprise an enclosure for testing the effects of specified environmental conditions on biological items, industrial products, materials, and electronic devices and components. Typically, both temperature and humidity are controllable within an environmental chamber.

A humidity chamber, a subcategory of environmental chambers, provides a controllable humidity within the chamber enclosure. Thus, the humidity chamber, and any chamber providing controllable humidity within the chamber interior space, requires a water source that supplies water with a resistivity value within a specified range and minimal bacteria and other contaminants.

One solution to supply quality water to the chamber (for humidifying the chamber) uses a water purification system that conditions the water to attain a water quality that is within a desired range. The system also reclaims and conditions condensate from within the chamber and includes other components to maintain the water quality. This inventive system (commercially known as CRSY102 or condensate recirculating system 102 or a water quality conditioning system) is described in the co-pending and co-owned patent application assigned application Ser. No. 18/213,240, filed on Jun. 22, 2023 and entitled System for Conditioning Water Quality, the contents of which are incorporated herein.

The present invention (commercially referred to by model number CRSY103, also known commercially as a water treatment system or a water purification system) represents an extension of the CRSY102 water purification system described in the co-owned application. With the additional functionality provided by the present inventive system, it is referred to as a water treatment system, in contrast to the water purification system of CRSY102.

The water treatment system of the present invention uses $H_2O_2$ (hydrogen peroxide), which has excellent anti-bacteria and anti-microbial properties, to chemically treat the water. In significant concentrations, the hydrogen peroxide is highly reactive, killing germs through an oxidation process. $H_2O_2$ also kills bacteria, viruses, and many other pathogens. According to the present invention, the water is continuously treated to kill bacteria and retard its growth. This process drastically reduces water contamination.

Before the $H_2O_2$-chemically treated water is injected into the chamber (where it will be used during the chamber humidification process) the treatment chemical must first be neutralized. By using a catalyst, such as a carbon filter located in-line and before the humidity injection point, the hydrogen peroxide is decomposed into water ($H_2O$) and oxygen ($O_2$). This chemical reaction is assured to be complete before the water flows to the evaporation/humidification system so that only clean water (i.e., $H_2O_2$ free) is introduced into the chamber. Unlike the prior art techniques, there is no chamber downtime when it is necessary to clean a water purification device within the system.

FIG. 1 illustrates the plumbing circuits and water treatment components of the present invention. A water treatment system 10 (sometimes referred to as a water purification system) supplies water to a chamber 11 for humidifying the chamber. In an embodiment where the system 10 is physically separated from the chamber 11, certain components are disposed between the system 10 and the chamber 11 and thus referred to as exterior components within an exterior region 12.

Within FIG. 1:

a heavy line signifies the $H_2O_2$ injection circuit or supply system, a single line signifies the main water circuit where the water is continuously treated with $H_2O_2$, the ionizer and deionizer circuits, and the auto and manual water fill intakes, a dashed line signifies the neutralized water ($H_2O_2$ converted to $H_2O$ and $O_2$) immediately before it is injected into the chamber interior for humidifying the chamber interior, a double line indicates the return water (also referred to as make-up water or condensate water) enroute back to the water treatment system 10.

Important components and processes in the $H_2O_2$ water treatment system 10 and the processes implemented by the system are described below.

An $H_2O_2$ supply system injects a controlled/defined amount of liquid $H_2O_2$ into a holding reservoir 22. In one embodiment the concentration of $H_2O_2$ in the system is preferably about 35%.

An $H_2O_2$ supply container 24 is a separate component that is removable and replaceable by the user. See FIGS. 6-8.

A pump 26 moves the $H_2O_2$ from the supply container 24 into the holding reservoir 22. Water from this reservoir, after passing through other treatment system components, is used to humidify an interior of the chamber 11.

Responsive to a measured value of the $H_2O_2$ in the water treatment system, a control system turns a pump 26 on/off to move the $H_2O_2$ from the supply container 24 into the holding reservoir 22. In one embodiment the control system that activates the pump is an open loop system, dispensing a fixed amount of $H_2O_2$ over a defined time period, where the time period is user adjustable. Dispensing of a fixed amount is accomplished as the control system turns the pump on for a defined duration.

In another embodiment the control system is a closed loop system with feedback. A sensor 30 measures the amount of $H_2O_2$ in the water in the holding reservoir 22 and regulates on/off times of the pump 26 to control the amount of $H_2O_2$ in the water according to a predetermined set point. The set point is adjustable by the user/operator. Alternatively, the sensor 30 is located in a water outlet line from the holding reservoir 22 or in another location in the water circuit.

As further described below, the aforementioned water treatment control system can be integrated with or separate from a chamber control system that controls various aspects of chamber operation.

Circulating treated water through 'most' of the main water circuit (depicted by a single line FIG. 1) maintains a uniform $H_2O_2$ concentration. The circulating water creates an advantageous stirring action throughout the wetted parts of the circuit.

A pump 34 (see FIG. 1) circulates the treated water through most internal and external (i.e., external to the water treatment system 10 of the invention) components of the water purification system 1.

A continuous drip bypass loop 36 bypasses the environmental chamber 11 and allows a small amount of treated water to circulate back into the system 10 through a condensate return circuit 38. The bypass loop 36 supplies water to a return reservoir 37 via a fixed orifice 39. Note that when the treated water reaches the chamber 11 it has effectively reached a dead-end and thus the chamber bypass loop is required to ensure continuous water circulation. The bypass loop 36 is shown as external to both the water purification system 10 and the chamber 11. In another embodiment the bypass loop and the fixed orifice can be disposed internally within either.

A condensate return loop 110 within the chamber 11 returns condensate from the chamber to the return reservoir 37. As described above, from the return reservoir 37 the condensate return circuit 38 returns the condensate water to the inventive system 10 for treating and filtering. Contamination is most likely present in these return condensate components because they are in direct contact with the chamber's return 'contamination prone' water lines (depicted as double lines in FIG. 1). Note that the return condensate does not contain $H_2O_2$ as described below, as it was removed by a carbon filter 40 prior to entering and humidifying the interior of the chamber 11.

$H_2O_2$ is removed (i.e., converted to $H_2O$ and $O_2$) as the treated water flows through the carbon filter 40 Note that the filter 40 is at a transition between the main water circuit and the humidification circuit within the chamber 11. As is known by those skilled in the art, other techniques and processes can be used to remove the $H_2O_2$.

Returning to the main water circuit within the system 10, when a solenoid 42 is in a first configuration, water from the holding reservoir 22 is pumped by the pump 34 through the particulate filter 44 to the main water circuit. When the solenoid 42 is in a second configuration, water from the condensate return loop is pumped by the pump 34 through the particulate filter 44 to the main water circuit. The particulate filter 44 includes an air bleed valve 144.

Responsive to a water resistivity measurement by a resistivity sensor 135, water within the system 10 is ionized or deionized as required relative to a desired water resistivity range.

If the measured resistivity is greater than the desired range, an ionization loop is activated by pumping ambient air (that includes CO2) via a pump 80 through a controllable solenoid 82 into the holding reservoir 22. The bubbling (or sparging) ambient air with CO2 ionizes the water. In another embodiment (not shown) the ionized water is supplied to an outflow line from the holding tank 22, instead of supplied directly to water within the tank.

If the measured resistivity is less than the desired rang of values, a water deionization loop is activated. A solenoid 50 is opened (under control of a microprocessor receiving the measured resistivity value, as described below), a solenoid 49 is closed and water is thereby directed through a deionizing cartridge 51.

To avoid deionizing the water from (or to) the holding reservoir 22, the water is directed around the deionizing cartridge 51 by closing the solenoid 50 and opening the solenoid 49.

A water intake line 70 provides a manual fill option for the holding reservoir 22 (in one embodiment comprising a three-gallon or seven-gallon holding tank).

An automatic water refill input 73, is opened and closed by operation of a solenoid 74 responsive to the water level in the holding reservoir 22 as determined by a low water level switch 76 and a high water level switch 77 disposed in the holding reservoir 22. In the illustrated embodiment the automatic water refill input supplies water to the main water circuit. In another embodiment, the automatic water refill input supplies water in to the holding reservoir 22.

The water refill operations are necessary to maintain the level of water inside the system 10 (and within the holding tank 22) to ensure sufficient water is available to humidify the chamber 11.

Certain embodiments of the system 10 provide only the manual water intake. And these embodiments do not require the high water level switch 77, as the operator can determine when to terminate the refill operation.

An air bleed valve 78, disposed on an upper surface of the holding reservoir 22, is opened to bleed air from within the reservoir as required when water is input to the holding reservoir 22.

A pressure transducer 88 measures pressure at the point where it is connected to the piping circuit. The pressure value is supplied to the microprocessor to operate the pump 34 if the pressure is below the desired pressure range.

A pressurized expansion tank 89 traps air within the system to allow pressurizing of the water circuits of the system 10.

A solenoid valve 90 is closed, as necessary, to isolate the system 10 from the exterior pipe circuit and from chamber 11.

A UV-C light source 100 disinfects the water by killing bacteria and living organisms. In the illustrated embodiment the UV-C light source is located within the chamber 11. In another embodiment, the UV-C light source is located in the exterior plumbing between the system 10 and the environmental chamber 11. In yet another embodiment, the UV-C light source is located within the plumbing circuit, such as within the reservoirs 22 and 37.

The chamber 11 is typically supplied by the user. Within the chamber, when a chamber solenoid 102 is opened, a chamber humidifier pump 104 supplies water to a humidity nozzle 106. A tray 108, one example of a condensate collection vessel, collects the condensate liquid and supplies same to the condensate return line 110, which is connected as an input to the return reservoir 37.

Extension loops 110 and 112 extend between the water treatment system 10 and the environmental chamber 11 as necessary depending on the physical separation between the treatment system and the camber.

An antimicrobial material 116 sets within the water, such as within the holding reservoir 22. Because the water is continuously circulated through at least segments of the treatment system 10 a small amount of agitation is created, to thereby ensure more effective use of the antimicrobial material.

The various solenoids illustrated in FIG. 1 are opened to allow water to pass through them and closed to stop water flow and thereby allow water flow through certain devices and thereby undergo certain processes associated with the present invention. The pumps shown in FIG. 1 pump the various fluids in paths controlled by opened and closed solenoids.

Default set points (e.g., water purity, pressure and quantity of injected $H_2O_2$) are set at the factory and once installed the water treatment system operates virtually unattended. The referenced default set points can also be adjusted by the user.

Figure 2:
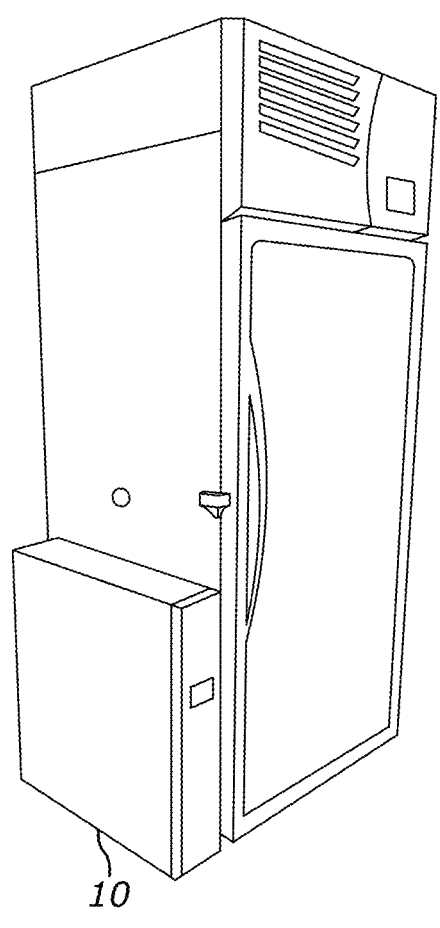
FIG. 2 shows a front surface of the system of the invention as attached to an exterior side surface of an environmental chamber.
Figure 3:
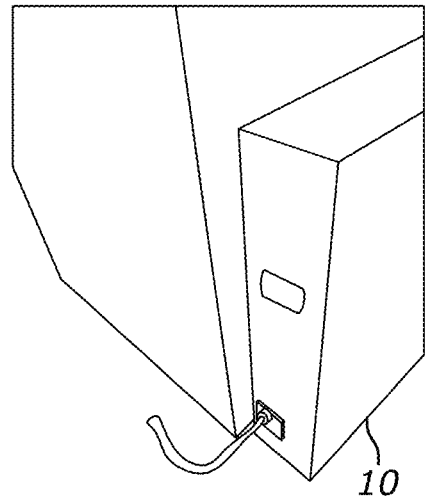
FIG. 3 shows the back surface of the system of the invention as attached to an exterior side surface of an environmental chamber.

The system 10 is physically attached to the chamber 11, but removable as desired by the user/operator. Typically, the system is attached by French cleats and screws. See FIGS. 2 and 3.

In one embodiment, the system 10 has a slim profile of about 6.5" wide, 30" deep, and 32" high.

Figure 4:
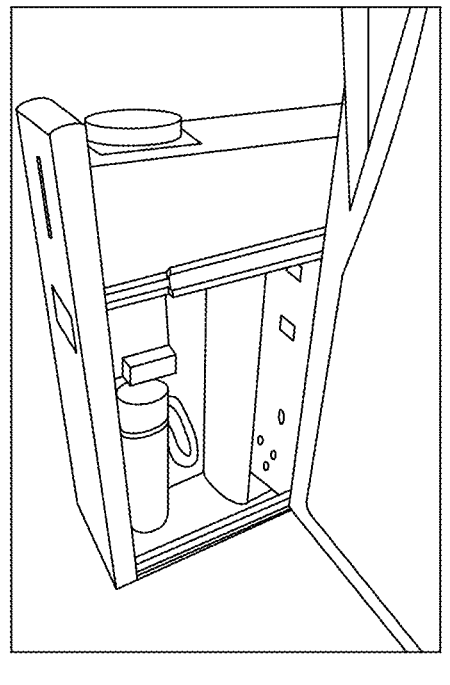
FIG. 4 depicts a drawer of the inventive system extended to its first stop to expose a particulate matter filter.
Figure 5:
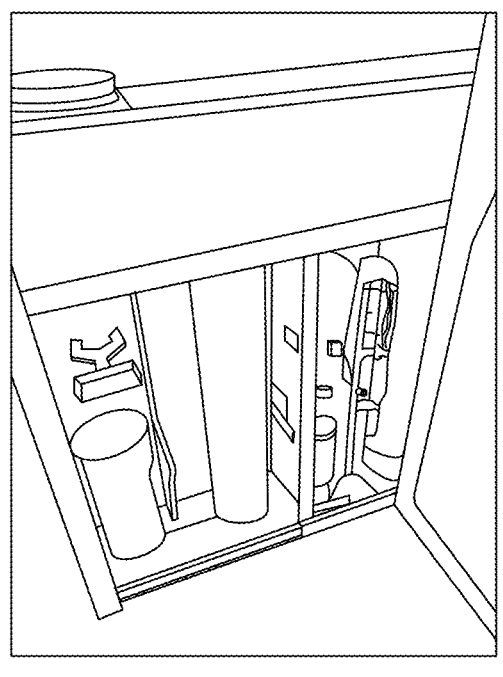
FIG. 5 depicts the drawer extended to its second stop to allow service access to the system of the invention.

The physical embodiment of the system 10 comprises a slide-out drawer for easy access to filters, the reservoir fill cap 78, and the $H_2O_2$ supply container 24. See FIGS. 4 and 5. A mechanical stop (similar to the tool-less activation clip referred to below) limits travel of the slide-out drawer.

Figures 6, 7, 8:
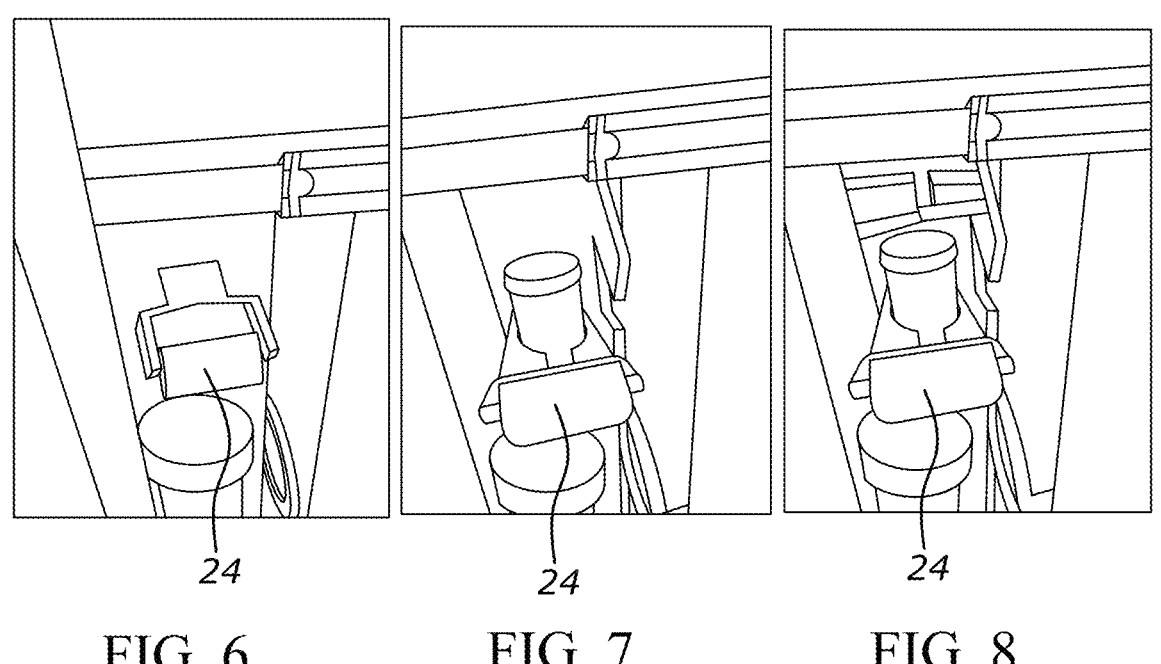
FIGS. 6-8 depict a process for removing the $H_2O_2$ canister.
Figure 9:
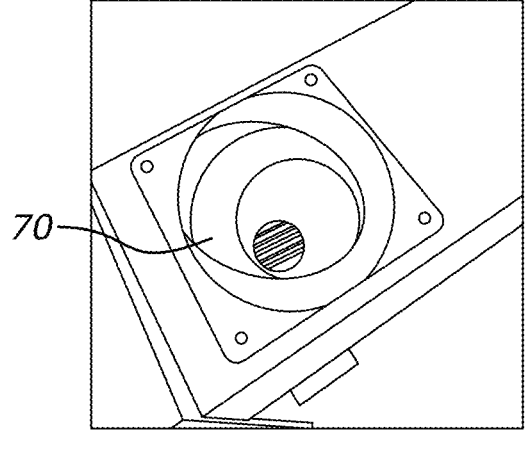
FIG. 9 shows the manual fill access port and the antimicrobial material within a holding reservoir.
Figure 11:
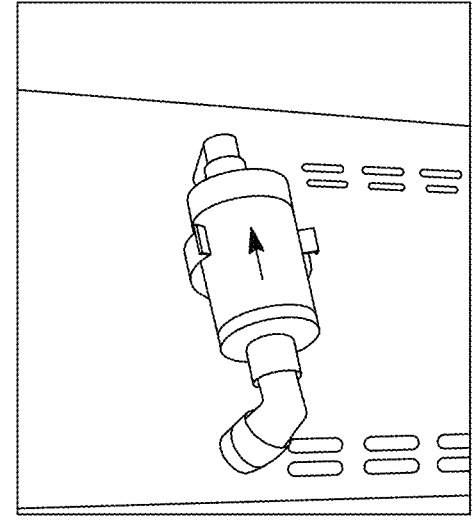
FIG. 11 illustrates the carbon filter visible upon lifting the front panel of the environmental chamber of FIG. 10.
Figure 10:
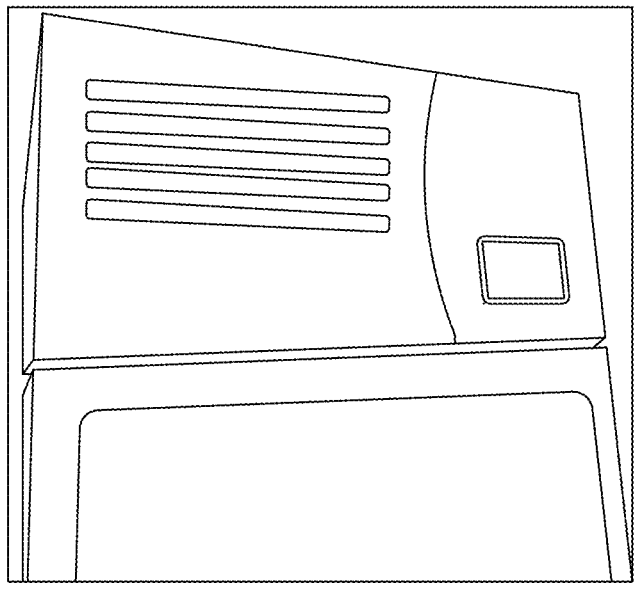
FIG. 10 illustrates an environmental chamber control panel

The process for removing the $H_2O_2$ supply container 24 is depicted in FIGS. 6-8.

Typically, the system 10 is in electrical communication with the chamber 11, including especially in communication with the chamber control system, receiving both electrical power and control signals from the chamber and supplying sensor data to the chamber control system. In a preferred embodiment, the water treatment system 10 is controlled through an interface with the environmental chamber 11. The operator enters values for controlling the water treatment system on the chamber's touchscreen and output values are displayed on that touchscreen. In another embodiment that control interface is an element of the water treatment system.

The holding reservoir 22 includes a water level sight glass (not shown) through a viewing window. Lights illuminate the reservoir water with blue and white light so that the water level can be easily seen. During a manual refill operation this visibility is especially critical.

In one embodiment the holding reservoir 22 can be manually filled through the fill cap 78 (that includes an air vent) or automatically via hard-plumbed line 73. THE level float switches 76 and 77 control the solenoid 74 for controlling the automatic refill process as determined by water level in the reservoir 22.

A priming operational mode for the $H_2O_2$ circuit first fills the tubing between the $H_2O_2$ supply container 24 and the holding reservoir 22. After this tubing is filled with $H_2O_2$, when a drop of $H_2O_2$ is pumped from the $H_2O_2$ supply 24, then a drop of $H_2O_2$ appears in the holding reservoir 22.

Notifications that appear on the touch screen (whether an element of the chamber 11 or the water treatment system 10) include the following.

The system 10 includes audio and visual alarms at local and remote sites for alerting responsible personnel.

These alarms include:

Water is not draining from the return reservoir 37 when the water level is too high, as determined by a level switch 130. The reservoir is designed to drain water and avoid a condition where the water level is too high. If the water does not drain and thus extends above the level switch 130 an alarm is activated.

Water level is low in the holding reservoir 22 as determined by the level switch 76.

Water is not filling automatically into the holding reservoir 22. The most likely cause is that the facility water that feeds the automatic refill is turned off.

Water pressure is low (i.e., below a set point) as determined by the pressure transducer 88. This condition indicates a system malfunction or that insufficient water is present in the system.

ALERT—signifying to the operator when it is time to perform preventative maintenance and filter replacement INFORMATION—alerting the operator that the filter drawer is extended, that is, the drawer had been extended to replace the various filters or the $H_2O_2$ supply cannister, but not closed. This condition limits functionality of the system.

REMINDER—that the $H_2O_2$ dispensing pump duration may need to be adjusted, which affects the amount (concentration) of $H_2O_2$ in the water.

Settable water pressure. This is a user-set variable that can be changed through the user interface. This value is the pressure in the water line to the environmental chamber 11 and is controlled by the pump 34.

ALERT—The water purity (resistivity) level, as determined by the water resistivity value sensed by a water resistivity sensor 135, has been below a set point range for an extended time, indicating that the deionizing cartridge 51 (resin) has malfunctioned or needs to be replaced.

ALERT—The water purity level is above the set point range for an extended time, indicating a malfunction of the ionizing system (the pump 80 and check valve 82).

Settable water purity target. This is another user-set variable that is changeable through the user interface.

Certain alerts are automatically activated on/off to indicate required testing and troubleshooting of system components.

The water treatment system of the present invention includes all the features of the system described in the referenced co-pending application Ser. No. 18/213,240 entitled System for Conditioning Water Quality, including, in particular, determining and controlling the water quality, i.e., resistivity.

The system accommodates the use of input water of any water quality (usually unknow) from tap water to ultra-pure water and automatically conditions the water to within a specified range by measuring the water quality with the resistivity sensor 135 as the water flows out of the holding reservoir 22. In other embodiments the water quality resistivity sensor is disposed at other locations in the water circuit.

A microprocessor (or another controller) compares the measured value against a desired value/range and activates a corresponding cycle (ionize or deionize) by appropriate control to open or close the necessary solenoid valves to bring the water quality to within the desired range. Pumping the water through the ion exchange resin cartridge 51 deionizes the water, or pumping ambient air (containing $CO_2$) by action of the pump 80 though water in the holding reservoir 22 to ionize the water.

Reclaimed water is also received from different source(s) (other than the source of the input water referred to above), including condensate water from the chamber 11. This water may also need to be conditioned and purified (that is, removal of contaminants and bacteria) as described herein.

The antimicrobial silver alloy 116 is submerged (wetted) in the water of the holding reservoir 22. In other embodiments, the silver alloy is disposed at other locations in the water circuit, such as within the return reservoir 37.

The pump 34 circulates water through system's internal plumbing loop to prevent stagnation The sediment filter 44, which in one embodiment comprises a particulate (not carbon) filter that purifies the water through absorption of the particulates. The system may also contain multiple filters (not shown) for purifying the water. In any case, for this $H_2O_2$-based system, the filter(s) is typically not a carbon briquette filter as carbon causes the $H_2O_2$ to prematurely decompose.

The system pressurizes the output water between about 3 psi and 100 psi, even if the incoming water pressure is less than 3 psi or greater than 100 psi. The pump 34 pressurizes the system and the pressure transducer 88 measures the pressure in the primary water circuit.

Ideal output water quality is achieved without mixing water at two different quality levels, as in prior art water purifier systems. In the related system for conditioning water quality, as described in the aforementioned co-owned application (CRSY102), the desired output water quality level is achieved using a bimodal process of ionizing and/or deionizing the water. That same process is used in the system 10 of the present invention.

The system 10 supply water of the desired quality to one or more chambers, although only one chamber is depicted in FIG. 1.

The system 10 (as well as the system of the co-pending application) can accept reclaimed water from one or more sources and condition the water to attain the desired output water quality level (e.g., resistivity).

Figure 12:
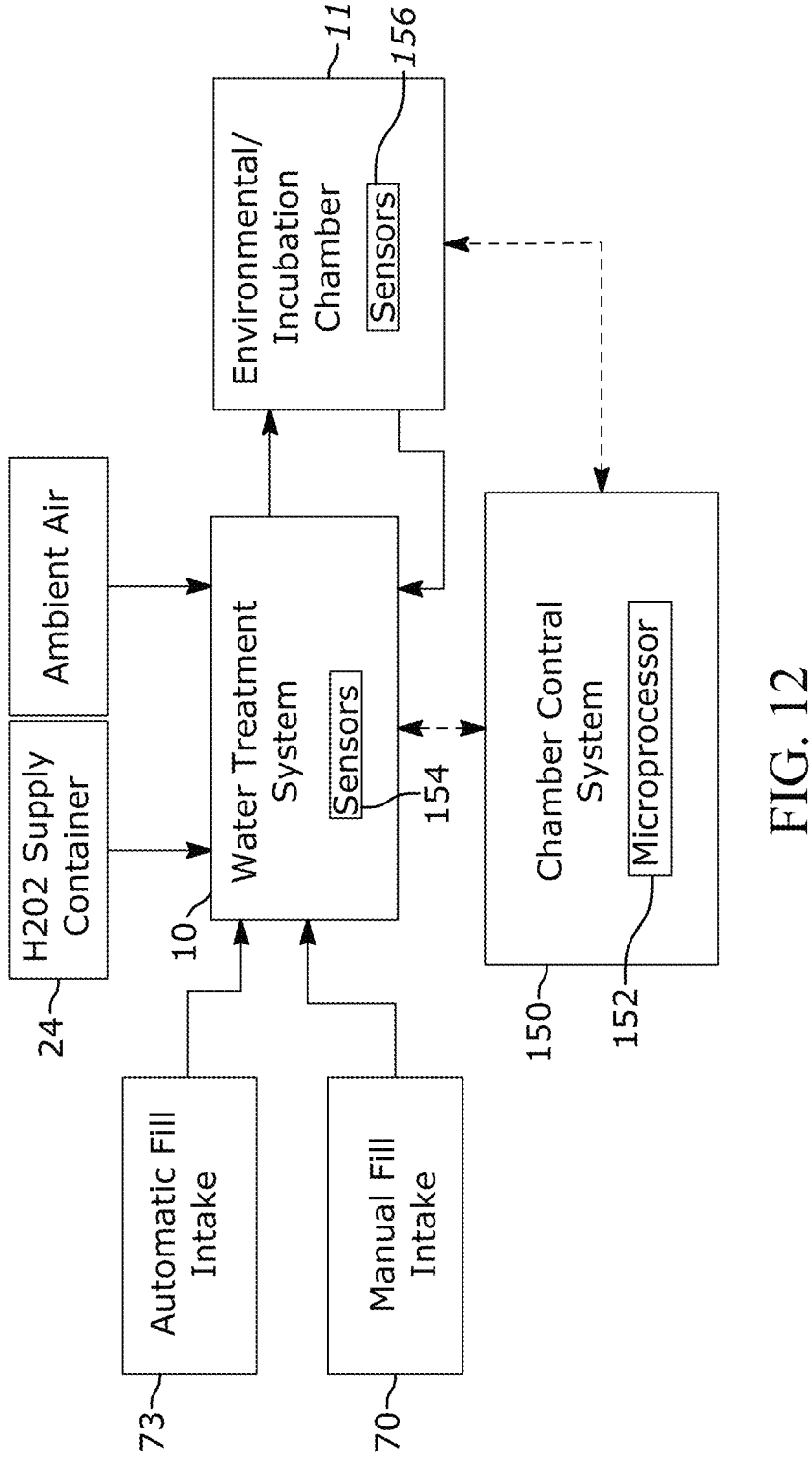
FIG. 12 is a block diagram of the water treatment system of the invention.

FIG. 12 is a block diagram depicting principle system control elements and the interface with chamber control system 150 that includes a microprocessor 152 (or another control device). Sensors 154 within the system 10, as described herein, measure various system parameters and report the measured values to the chamber control system 150 and the microprocessor 152 therein. Sensors 156 within the chamber 11 also report measured values to the chamber control system 150 and the microprocessor 152 therein. Responsive to these measured parameters, the microprocessor 152 closes and opens certain solenoid valves and actives certain subsystems and processes within the system 10 (by activating associated pumps) thereby treating the water to attain desired characteristics and quality.

What is claimed is:

1. A water treatment system for supplying water for use in humidifying a chamber the system comprising:
   a piping circuit for carrying water and comprising a plurality of controllable valves to determine water flow paths through the piping circuit thereby subjecting the water to one or more water treatment processes;
   a holding reservoir for receiving intake water from one or more water sources;
   a source of H2O2;
   a first pump;
   a second pump for pressurizing the piping circuit;
   a control system for activating the first pump to supply H2O2 from the source into the piping circuit according to a predetermined schedule or according to a measured concentration of H2O2 in the piping circuit;
   a H2O2 neutralizing device for neutralizing the H2O2 in the water prior to supplying the water to humidification components in the chamber to humidity the chamber; and
   an antimicrobial silicone dioxide coating applied to wetted surfaces of predetermined components of the piping circuit.

2. The water treatment system of claim 1, wherein the H2O2 is supplied into the holding reservoir.

3. The water treatment system of claim 1, further comprising a sensor disposed in the piping circuit for measuring the concentration of H2O2 in the piping circuit and for supplying a measured H2O2 concentration value to a control device for controlling the first pump responsive to the measured H2O2 concentration.

4. The water treatment system of claim 3, wherein the sensor is disposed in the holding reservoir.

5. The water treatment system of claim 1, the predetermined schedule for supplying a fixed amount of H2O2 into the holding reservoir over a defined time period to attain a predetermined H2O2 concentration.

6. The water treatment system of claim 5, wherein the predetermined H2O2 concentration is adjustable by the user.

7. The water treatment system of claim 1, wherein a nominal concentration of H2O2 in the piping circuit is 35%.

8. The water treatment system of claim 1, wherein the source of H2O2 comprises an H2O2 supply container.

9. The water treatment system of claim 8, further comprising an alarm activated to alert an operator to replace the H2O2 supply container.

10. The water treatment system of claim 1, wherein the H2O2 neutralizing device is located within the chamber or at an output line of the system into the chamber.

11. The water treatment system of claim 1, wherein operation of the chamber is controlled by a chamber control system, the water treatment system controlled by the chamber control system responsive to operator inputs associated with the water treatment system and inputs to the chamber control system from sensors disposed in the piping circuit.

12. The water treatment system of claim 11, wherein the chamber control system comprises a microprocessor or a microcontroller.

13. The water treatment system of claim 11, wherein inputs from the sensor represent operational parameters of the water treatment system.

14. The water treatment system of claim 1, wherein components comprising the water treatment system are disposed in an enclosure, the enclosure physically attached to the chamber.

15. The water treatment system of claim 1, further comprising one or more of a filter cartridge, a pressurized expansion tank, and an ultra-violet purifier, wherein responsive to an opened or closed status of predetermined solenoid valves within the piping circuit, water flows through the one or more of the filter cartridge, the pressurized expansion tank and the ultra-violet purifier.

16. The water treatment system of claim 1, further comprising a sensor for measuring water quality of the water in the holding reservoir or water in the piping circuit and for producing a signal representative of a measured water quality, a control device for receiving the signal, for comparing the measured water quality with a desired water quality range or with a desired water quality value, and for controlling predetermined controllable solenoid valves within the piping circuit to deionize the water or to ionize the water responsive to the measured water quality.

17. The water treatment system of claim 1, the piping circuit further comprising a bleed bypass line for feeding back water from proximate an output valve of the piping circuit to another system component of the piping circuit to prevent water stagnation, wherein when the output valve is in an open condition, water is supplied from the treatment system to the chamber.

18. A water treatment system for supplying water for use in humidifying a chamber, the system comprising:

a piping circuit for carrying water and comprising a plurality of controllable valves to determine water flow paths through the piping circuit thereby subjecting the water to one or more water treatment processes;

a holding reservoir for receiving intake water from one or more water sources;

a source of H2O2;

a first pump;

a second pump for pressurizing the piping circuit;

a control system for activating the first pump to supply H2O2 from the source into the piping circuit according to a predetermined schedule or according to a measured concentration of H2O2 in the piping circuit;

a H2O2 neutralizing device for neutralizing the H2O2 in the water prior to supplying the water to humidification components in the chamber to humidity the chamber; and wherein the holding reservoir is an element of the piping circuit and the control system supplies H2O2 from the source into the holding reservoir, the system further comprising a condensate reservoir, wherein condensate water from the chamber is supplied to the condensate reservoir, water in the condensate reservoir combined with water from the holding reservoir by opening or closing predetermined controllable valves to create a water flow path that mixes water from the condensate reservoir with water from the holding reservoir.

19. A water treatment system for supplying water for use in humidifying a chamber, the system comprising:

a piping circuit for carrying the water and comprising a plurality of controllable valves to determine water flow paths through the piping circuit, wherein opened and closed valves subject the water to one or more water treatment processes, comprising ionizing and deionizing the water;

a first sensor for measuring a water resistivity in the piping circuit, wherein a controller responsive to a measured water resistivity value controls one or more controllable valves to subject the water to an ionization or deionization process;

a second sensor for measuring a concentration of H2O2 in the piping circuit;

the piping circuit comprising a holding reservoir configured to automatically or manually receive intake water from one or more water sources;

a source of H2O2;

a first pump for supplying H2O2 into the holding reservoir;

a control system for activating the first pump responsive to a measured H2O2 concentration to supply H2O2 from the source into the piping circuit, the first pump activated according to a predetermined schedule for supplying a fixed amount of H2O2 into the holding reservoir or activated to achieve a predetermined H2O2 concentration in the holding reservoir;

wherein the predetermined H2O2 concentration is adjustable by the user;

an alarm activated to alert an operator to replace the source of H2O2;

a H2O2 neutralizing device for neutralizing the H2O2 in the water prior to supplying the water to humidification components in the chamber for use in humidifying the chamber;

an antimicrobial silicone dioxide coating applied to wetted surfaces of the piping circuit; and an ultra-violet purifier disposed in the piping circuit or in the chamber, for disinfecting the water.

* * * * *